United States Patent [19]

Gustafson

[11] Patent Number: 5,447,187
[45] Date of Patent: Sep. 5, 1995

[54] TRUCK DOOR CUSHION

[76] Inventor: Robert E. Gustafson, 2392 Lake Angelus La., Lake Angelus, Mich. 48326

[21] Appl. No.: 197,206
[22] Filed: Feb. 16, 1994
[51] Int. Cl.$^6$ ............................................. E06B 7/16
[52] U.S. Cl. ................................. 160/40; 49/475.1
[58] Field of Search ............... 160/40, 201, 41, 229.1, 160/207; 49/482.1, 475.1

[56] References Cited

U.S. PATENT DOCUMENTS

| | | | |
|---|---|---|---|
| 370,207 | 9/1887 | Negroponte | 49/482.1 |
| 2,837,151 | 6/1958 | Stroup | 160/40 |
| 3,023,804 | 3/1962 | Howell | 160/40 |
| 3,034,575 | 5/1962 | Stroup | 160/40 |
| 3,104,699 | 9/1963 | Wolf et al. | 160/201 X |
| 3,462,885 | 8/1969 | Miller | 49/475.1 |
| 3,941,180 | 3/1976 | Thill | 160/201 X |
| 4,123,875 | 11/1978 | Herschberg | 49/482.1 |
| 4,436,336 | 3/1984 | Shimizu | 296/76 |
| 4,860,813 | 8/1989 | Ballyns et al. | 160/188 |

FOREIGN PATENT DOCUMENTS 252798  7/1964  Australia ............. 49/482.1

Primary Examiner—David M. Purol
Attorney, Agent, or Firm—Basile and Hanlon

[57] ABSTRACT

A roll-up door for a truck or the like is provided with a sealing member in order to seal the lower edge of a door against a lower sill when the door is in the closed position. The sealing member comprises three sealing strips consisting of two end strips made of a rigid rubber material and a center strip having a hollow cavity to provide pliancy thereto. The three sealing strips lay adjacent and abut one another along the lowermost portion of the door to provide a seal. The inner surfaces of each end strip that abut the center strip have exposed pins that are received in the hollow cavity of the center strip.

11 Claims, 2 Drawing Sheets

TRUCK DOOR CUSHION

FIELD OF THE INVENTION

The present invention relates to a sealing member located at the bottom edge of a roll-up door, particularly roll-up doors-used as doors for vans and trucks.

BACKGROUND OF THE INVENTION

Many commercial delivery companies employ trucks with roll-up side or rear doors to gain access to merchandise stored within the trucks. The roll-up door encloses a doorway leading into the cavity of the truck. At the bottom edge of the doorway is a sill. At the bottom of the roll-up door is a seal which conforms to the sill when the roll-up door is in the closed position. The seal is generally made of a solid rigid material such as rubber that will keep the elements out of the cavity of the truck but yet will not damage the sill when the roll-up door is being closed. A strap adhered to the interior wall of the roll-up door and extending beyond the bottom edge of the doorway aids an operator in lowering the door.

When closing the door, the operator will generally pull down on the strap. As the door is lowered, the downward velocity of the door increases. When the door nears the sill, frequently the operator will throw the strap into the cavity of the truck so that the strap does not extend outside of the truck to be exposed to the elements or to drag on the ground. An injury may occur if the operator does not act quickly enough and catches his hand or a portion thereof between the seal and the sill of the doorway. The velocity of the door results in such a force that injury to the hand and loss of fingers have occurred when the hand was caught between the seal and the sill.

SUMMARY OF THE INVENTION

It is therefore an object of the present invention to provide a seal for a roll-up door which minimizes or eliminates the chance of injury. It is also an object of the invention to provide a seal that conforms to the sill, but yet does not damage the sill on contact. It is further an object of the invention to provide a seal that is durable under various environmental conditions.

According to the present invention, a three-part seal is slidably mounted to the bottom edge of the roll-up door. The proposed seal consists of two elongated rigid strips at each end of the door bottom and a center elongated flexible strip situated in between the two rigid strips. The flexible strip has a hollow interior to allow for its flexibility. The flexible strip is held in alignment with the two end rigid strips by pins extending from the rigid strips. The pins protrude a couple of inches from the inner ends of the rigid strips and slide into the hollow interior of the flexible strip.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
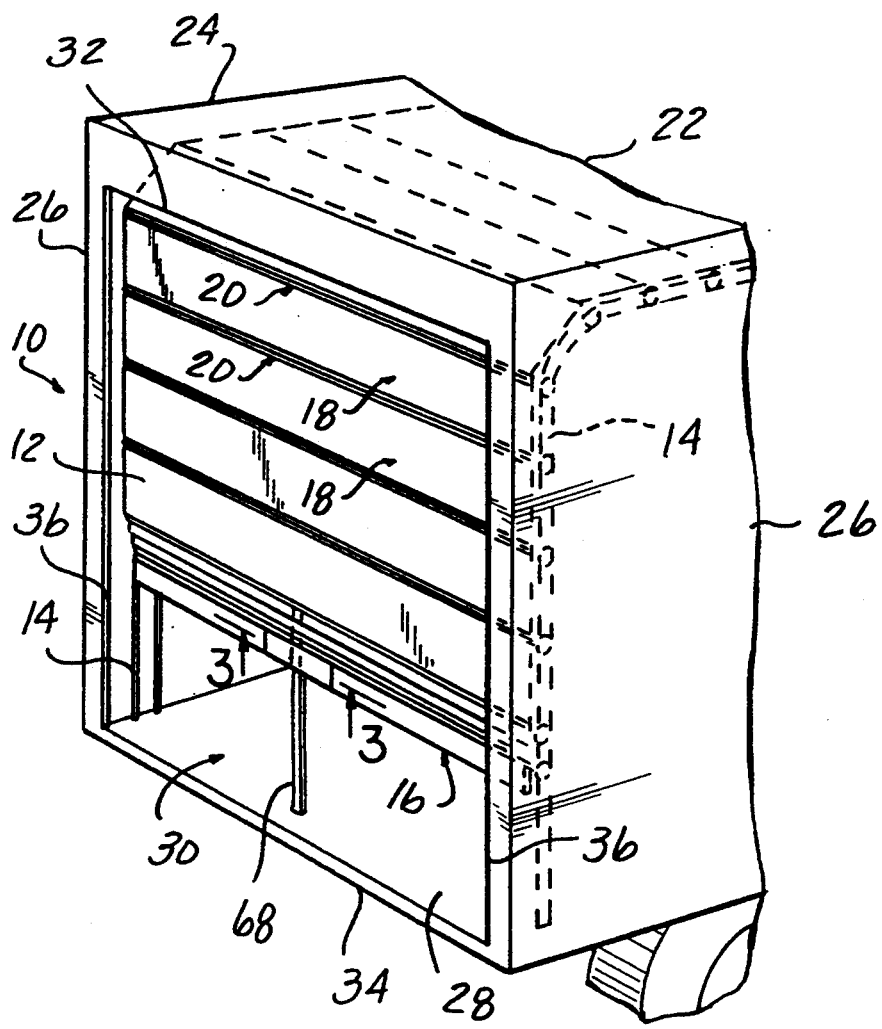
FIG. 1 is a pictorial view illustrating a roll-up door in a partially open position.
Figure 3:
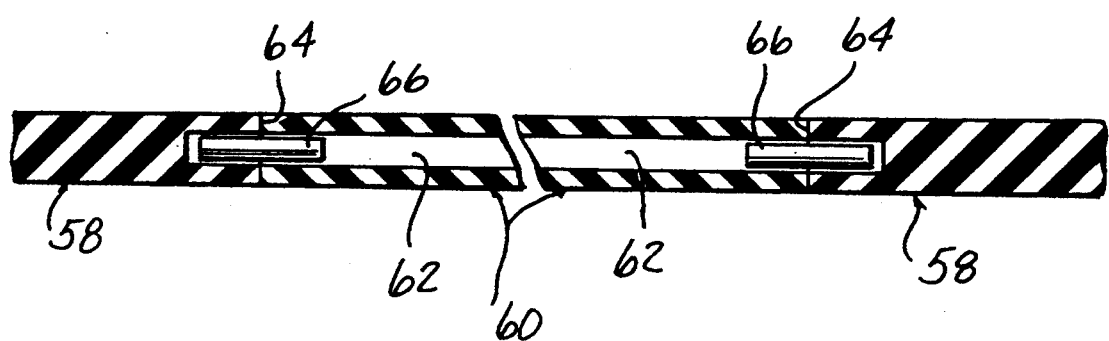
FIG. 3 is partially section view of the seal taken along lines 3—3 of FIG. 1.

With reference to the drawings, the reference numeral 10 generally refers to a door assembly constructed in accordance with the embodiment of the present invention. The door assembly 10 includes a door 12, a pair of guide tracks 14 and a seal 16. The door 12 may consist of a plurality of door panels 18 which are hingedly connected in an edge-to-edge relationship by means of hinges 20.

A portion of a container body which the roll-up door of the present invention may be located is generally identified by the reference numeral 22 and is shown for purposes of facilitating illustrations of the door seal 16. The container body 22 includes a top wall 24, a pair of sidewalls 26 and a floor 28. A doorway 30 can be formed at one end or side of the container body 22. The doorway 30 is surrounded by an upper 32, a lower 34 and two side sills 36. Adjacent to each side sill 36 and extending up the top wall 24 and into the cavity of the container is a guide track 14 defining the path of travel of the door 12 as it is raised and lowered.

Figure 2:
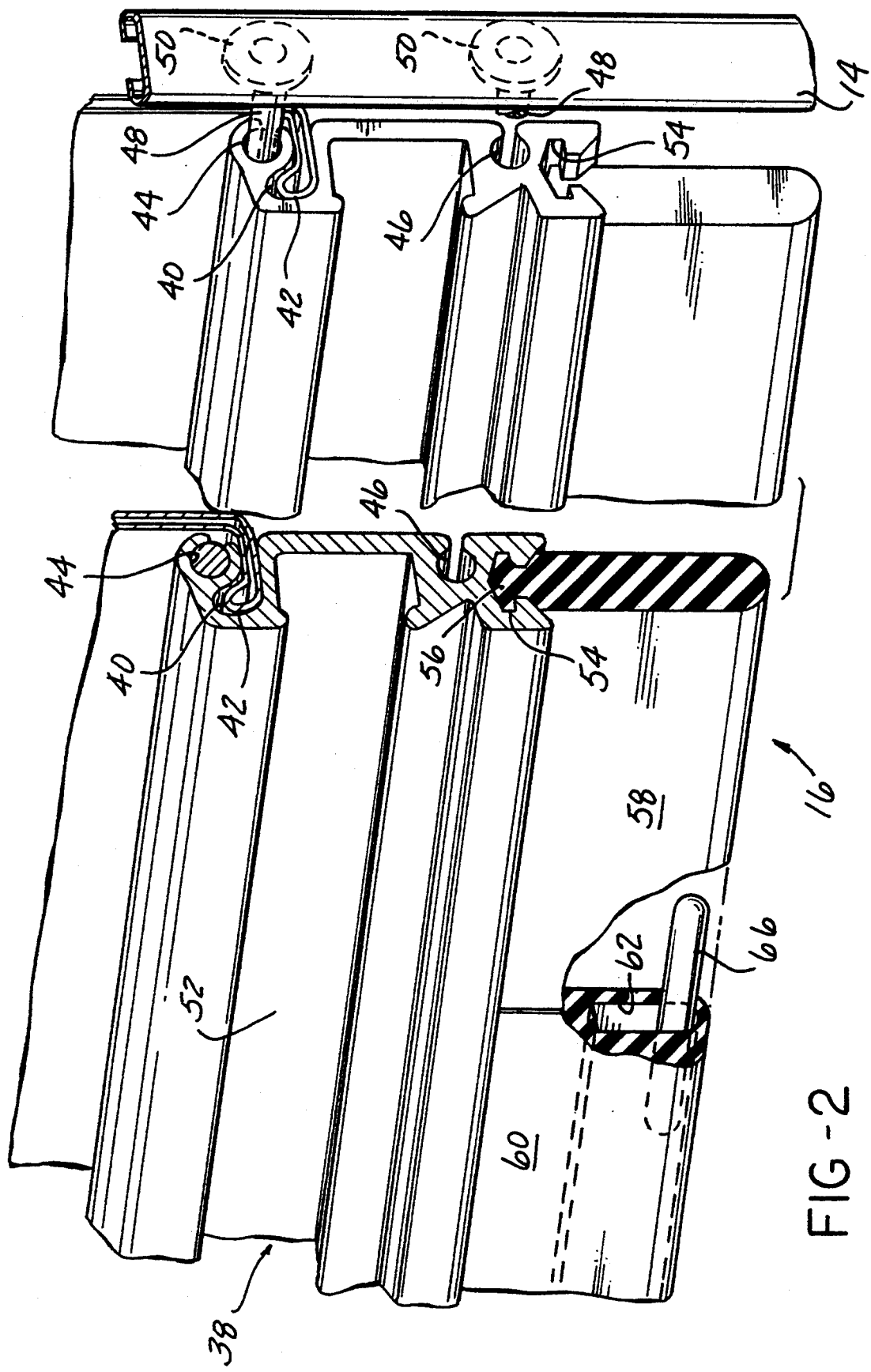
FIG. 2 is a partially sectioned perspective view of the seal of the door.

At the lowermost portion of door 12, of the preferred embodiment, is a solid metal strip 38 extending the width of door 12. The top portion of the metal strip 38 secures the lowermost door panel; and the bottom portion of the metal strip 38 secures the sealing member 16. As best seen in FIG. 2, the metal strip 38 is formed so that an upper portion proximate to its upper end has a curved cavity 40 running the entire width of the door 12 for receiving a lip 42 on the lowermost door panel 18. The lip 42 on the door panel is slidably received into the curved cavity 40 of the metal strip 38 to securely attach the metal strip 38 thereon. In the preferred embodiment, the metal strip 38 forms upper 44 and lower channels 46 for receiving pivot pins 48 attached to rollers 50 at each end of the metal strip 38 whereby the rollers 50 travel in the guide tracks 14 as the door 12 is raised and lowered. A C-channel 52 is also formed in the center portion of the metal strip 38 to facilitate a finger hold to raise the roll-up door. On the lower face of the metal strip 38 an angular T-shaped slot 54 is formed in the metal strip 38 and extending the entire width of the metal strip 38.

In order to seal the lower edge of the door 12 against the lower sill 34 when the door 12 is in a closed position, a sealing member 16 is provided. The sealing member 16 is made of a moldable material such as rubber and formed with an angular T-shaped rib 56 extending along its upper face and proportioned to fit within the T-shaped slot 54 of the metal strip 38. Both the metal strip 38 and sealing member 16 have the same length as the door bottom width.

The preferred embodiment of the sealing member 16 consists of at least three separate strips of elongated rubber material which slide into the T-shaped slot 54 so that they are adjacent and abut one another. The two outside ends 58 of the sealing member 16 are made of a solid rubber material. A center strip 60 is generally configured in the same shape and made of the same rubber material as the two end sealing strips 58; except that the center strip 60 has a hollowed region 62 within the interior of strip 60 that extends the length of the center strip. The hollowed region 62 allows the center strip 60 to be more pliant and yielding to a structure or an obstruction. Therefore, if the driver or other operator is lowering the door 12 and does not remove his hand quickly enough, the center strip 60 of the sealing member 16 will yield upon contact with the operator's hand.

To ensure that the center strip 60 will align with the two end strips 58, and to prevent the center strip 60 from misshapening, the two inner ends 64 of the end strips 58 that abut the center strip 60 are provided with pins 66 securely attached to the end strips 58 so that approximately 1 to 2 inches of the pins are exposed toward the center strip 60. The pins 66 of the end strips 58 will slide within the hollow portion of the center strip 60 and be secured there to keep the center strip 60 aligned with the end strips 58 and to provide an adequate seal of the door assembly 10. The hollow portion 62 is shaped to snugly receive the extending pin 66.

Although the hollow strip 60 is not required to be located in the center of the sealing member 16; it is preferred that the hollowed strip 60 be located at the position where a strap 68 extends down from the door 12. This is the location where the operator's hands are most vulnerable for injury. It is also preferred that the strap 68 and hollowed strip 60 be located in the general center area of the lower door edge so that the strap 68 provides a more efficient downward force upon the door 12; and so that the hollowed strip 60 can abut and be secured to rigid solid strips at both ends to provide added strength across the entire sealing member 16 length. It is obvious that the sealing member 16 of the invention can be applied to a garage door, as well as a door to a van or truck. It is also obvious that the sealing member 16 of the invention can be applied to horizontally sliding doors as well.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A roll-up door assembly for a container, said container having an open position defining a doorway, said assembly comprising:
   a door slidably mounted to the doorway and moveable upward and downward relative to the container to open and close the doorway formed in said container;
   said door having a top edge, a pair of side edges and a bottom edge;
   said bottom edge securing a sealing member an entire length thereof;
   said sealing member comprising an elongated strip having a rigid portion having a length less than the length of the bottom edge and a flexible portion having a length less than the bottom edge, wherein said rigid portion is juxtaposed to said flexible portion to form the sealing member such that the length of the rigid portion together with the length of the flexible portion is essentially the same length as the bottom edge.

2. The roll-up door assembly as described in claim 1 wherein said sealing member is slidably mounted to a projection from the bottom edge of said door.

3. The roll-up door assembly as described in claim 2 wherein said projection is a metal strip, said metal strip having a lower face wherein a T-shaped slot is formed.

4. The roll-up door assembly as described in claim 3 wherein the sealing member further comprises a T-shaped rib corresponding to the T-shaped slot of the metal strip.

5. The roll-up door assembly as described in claim 1, wherein the rigid portion is a separate solid strip and the flexible portion is a separate hollow strip each individually slidably mounted to a projection extending from the bottom edge.

6. The roll-up door assembly as described in claim 5, wherein the hollow strip has a hollow portion that extends the length of the hollow strip.

7. The roll-up door assembly as described in claim 6, wherein the solid strip has a pin extending from a side face, said pin configured to be slidably received in the hollow portion.

8. A sliding door assembly for a container, said container having an open position defining a doorway, said assembly comprising:
   a door slidably mounted to the doorway and moveable relative to the container to open and close the doorway formed on said container;
   said door having an edge;
   said edge securing a sealing member along an entire length thereof; and
   said sealing member comprising an elongated rigid strip and an elongated hollow strip having a hollow portion extending therethrough, said elongated rigid strip contiguous to the elongated hollow strip and each strip slidably mounted to the edge, wherein said rigid strip has a side face abutting the hollow strip.

9. The sliding door assembly of claim 8 wherein the sealing member further comprises a pin extending from the side face of the rigid strip and slidably received in the hollow portion of the hollow strip.

10. The sliding door assembly of claim 9 wherein the sealing member comprises a pair of rigid strips, wherein the hollow strip is located therebetween.

11. The sliding door assembly of claim 10 wherein the door assembly further comprises a manual device to slidably close the door, wherein the hollow strip is positioned proximate to the manual device.

* * * * *